No. 642,068. Patented Jan. 30, 1900.
E. B. BECK.
ROLLER ATTACHMENT FOR COTTON OR CORN PLANTERS.
(Application filed June 7, 1897.)
(No Model.)

Witnesses.
Ezekiel B. Beck,
Inventor.

United States Patent Office.

EMERZIAH B. BECK, OF SULPHUR SPRINGS, TEXAS.

ROLLER ATTACHMENT FOR COTTON OR CORN PLANTERS.

SPECIFICATION forming part of Letters Patent No. 642,068, dated January 30, 1900.

Application filed June 7, 1897. Serial No. 639,784. (No model.)

*To all whom it may concern:*

Be it known that I, EMERZIAH BLACKSTONE BECK, a citizen of the United States of America, residing at Sulphur Springs, in the county of Hopkins, State of Texas, have invented certain new and useful Improvements in Roller Attachments for Cotton or Corn Planters, of which the following is a specification.

This invention relates to walking cotton and corn planters; and has for its object the provision of improved means for covering and leveling the furrow into which the seed is dropped, as well as regulating the depth of furrow made by the covering-plows.

Having the foregoing object in view, the invention consists of the combination, with covering-plows and their standards located in transverse alinement, of a single transversely-disposed combined gage and leveling-roller located immediately in the rear of said plows and extending from one to the other, hangers to which the roller is journaled at its ends and which have a plurality of vertically-arranged bolt-holes, and removable bolts passed through said holes and holes in the plow-standards, whereby vertical adjustment of the hangers and roller can be had.

Figure 1:
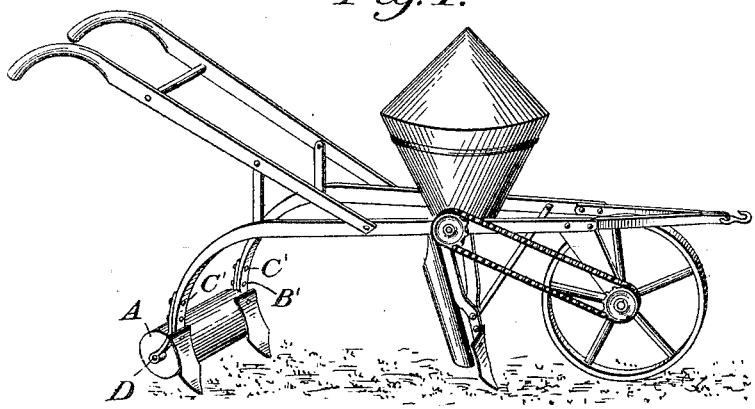
Figure 2:
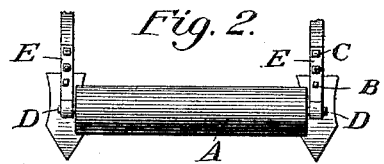
Figure 3:
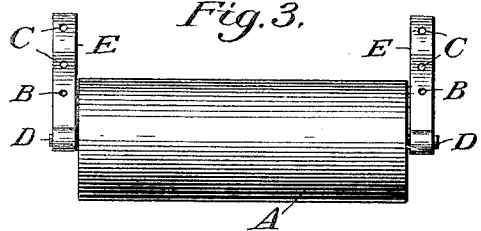
Figure 4:
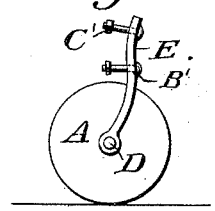

In the accompanying drawings, Figure 1 is a perspective view of a corn or cotton planter equipped with my improvements; Fig. 2, a detail rear view of the roller and covering-plows; Fig. 3, an enlarged detail view of the roller and its hangers, and Fig. 4 a detail end view of the roller and one hanger.

The planter illustrated in Fig. 1 is of the usual construction, being provided with a seed hopper and spout, a drill or plow to open the furrow for the seed, and covering-plows at the rear of the machine to close the furrow.

A represents a plain cylindrical roller having stub-spindles D at its ends and of suitable length to reach from one covering-plow to the other.

E E are hangers provided with bearings at their lower ends, which receive the spindles or journals D, so that the roller can turn freely. These hangers are shaped to properly conform to the backs of the plow-standards and are provided with a plurality of bolt-holes B and C, arranged vertically and adapted to receive removable bolts B' and C', which pass through the plow-standards. With this construction the hangers can be adjusted vertically in relation to the plow-standards, thus regulating the depth to which the covering-plows sink. The roller, following close after the covering-plows, levels the bed in which the seed is planted. The adjustability of the covering-roller permits of regulation to suit the character of the soil and the size of the seed being planted, permitting covering at any depth, and as the seed is covered just where it falls all scattering is prevented.

I am aware that it has been proposed heretofore to provide a walking-planter with a roller for leveling the bed, and I do not, therefore, claim such a construction broadly; but

What I claim as new, and desire to secure by Letters Patent, is—

In a walking-planter the combination with covering-plows and their standards, located in transverse alinement of a single transversely-disposed combined gage and leveling-roller located immediately in rear of said plows and extending from one to the other, hangers to which the roller is journaled at its ends and which have a plurality of vertically-arranged bolt-holes, and removable bolts passed through said holes and holes in the plow-standards, whereby vertical adjustment of the hangers and roller can be had.

E. B. BECK.

Witnesses:
W. L. BILEY,
ELISHA MASON.